US011763488B2

(12) United States Patent
Warnaar et al.

(10) Patent No.: US 11,763,488 B2
(45) Date of Patent: *Sep. 19, 2023

(54) LOCATION DETERMINATION IN A GPS-DENIED ENVIRONMENT WITH USER ANNOTATION

(71) Applicant: Applied Research Associates, Inc., Albuquerque, NM (US)

(72) Inventors: Dirk B. Warnaar, Raleigh, NC (US); Douglas J. Totten, Raleigh, NC (US)

(73) Assignee: Applied Research Associates, Inc., Albuquerque, NM (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/460,466

(22) Filed: Aug. 30, 2021

(65) Prior Publication Data

US 2021/0390737 A1    Dec. 16, 2021

Related U.S. Application Data

(63) Continuation of application No. 16/851,561, filed on Apr. 17, 2020, now Pat. No. 11,107,244.

(51) Int. Cl.
| | | |
|---|---|---|
| *G06T 1/00* | (2006.01) | |
| *G06T 7/73* | (2017.01) | |
| *H04W 4/029* | (2018.01) | |
| *G06T 7/13* | (2017.01) | |
| *G06T 7/60* | (2017.01) | |
| *G06T 17/05* | (2011.01) | |
| *G01C 21/00* | (2006.01) | |
| *G06T 5/00* | (2006.01) | |

(52) U.S. Cl.
CPC .............. *G06T 7/75* (2017.01); *G01C 21/005* (2013.01); *G06T 5/007* (2013.01); *G06T 7/13* (2017.01); *G06T 7/60* (2013.01); *G06T 17/05* (2013.01); *H04W 4/029* (2018.02); *G06T 2207/20084* (2013.01); *G06T 2207/20104* (2013.01)

(58) Field of Classification Search
CPC ......... G06F 3/0418; G06T 9/00; G06T 7/521; G06T 7/55; G06T 7/70; G06T 11/60; G06N 5/003; G16H 50/50; G06K 9/00791; G01C 21/30; G06Q 10/63114; B64C 39/024; G05D 1/101
See application file for complete search history.

(56) References Cited

U.S. PATENT DOCUMENTS 8,873,857 B2 *  10/2014  Frank ...................... G06F 3/011
                                                            382/182
2020/0034638 A1 *  1/2020  Brewington ............ G01S 17/06

* cited by examiner

*Primary Examiner* — Phuoc H Doan
(74) *Attorney, Agent, or Firm* — Erise IP, P.A.

(57) ABSTRACT

Systems and methods for determining a geographic location of an environment from an image including an annotation on a mobile device without GPS, with no network access, and with no access to peripheral devices or media is described. Open source data indicative of the earth's surface may be obtained and combined into grids or regions. Elevation data may be used to create skyline models at grid points on the surface. An image of an environment may be obtained from a camera on a mobile device. The user of the mobile device may trace a skyline of the environment depicted in the image. The annotation may be used to create reduced regions for edge detection analysis. The edge detection analysis may detect the skyline. The detected skyline may be compared to the skyline models to determine a most likely location of the user.

20 Claims, 10 Drawing Sheets

LOCATION DETERMINATION IN A GPS-DENIED ENVIRONMENT WITH USER ANNOTATION

RELATED APPLICATIONS

This patent application is a continuation application claiming priority benefit, with regard to all common subject matter of U.S. patent application Ser. No. 16/851,561, filed Apr. 17, 2020, and entitled "LOCATION DETERMINATION IN A GPS-DENIED ENVIRONMENT WITH USER ANNOTATION" ("the '561 Application"). The identified earlier-filed patent application is hereby incorporated by reference in its entirety into the present application.

This non-provisional patent application shares certain subject matter in common with earlier-filed U.S. patent application Ser. No. 16/818,552 filed Mar. 13, 2020, and entitled LANDMARK CONFIGURATION MATCHER. The earlier-filed application is hereby incorporated by reference in its entirety into the present application.

BACKGROUND

1. Field

Embodiments of the invention generally relate to geolocation, and more particularly to techniques for determining the position of an application user in GPS-denied environments.

2. Related Art

Traditionally, determining an unknown location relies upon measuring angles (triangulation) or distances (trilateration) to predetermined points of known location (i.e., landmarks). For example, celestial navigation relies upon measuring the angles to known stars whose positions are recoded in ephemerides, thus serving as landmarks for geolocation. Similarly, global positioning system navigation relies on determining the distances to a number of satellites that continually broadcast their positions. However, in some circumstances, such as an urban environment, GPS may be unavailable or inaccurate. Environments where GPS satellites are obscured, however, are the very environments where the predetermined points of known location useable for triangulation are also obscured. Existing methods for GPS-denied navigation rely on time-consuming manual methods such as resection.

What is needed is a technique that can quickly and automatically identify a location in GPS-denied environments utilizing visual information. Specifically, when a location is not known but visual information such as, for example, building skylines, landcover, or landmarks are known, the location can be determined. User supplied inputs, or annotations, may be provided to reduce the data that may be processed by providing regions in a captured image where the skyline may exist. The skyline may be traced by the user reducing the overall number of pixels that must be analyzed in the image for skyline detection. The resulting skyline detection may then be compared to regularly-spaced elevation data, such as Digital Surface Models (DSM) and Digital Elevation Models (DEM), and general elevation data that may be irregularly-spaced, such as point cloud data, for determining the location.

SUMMARY

Embodiments of the invention address the above-described need by providing for novel techniques for determining a location based on visual information and user annotations. The user may take a video or a photo of the surrounding environment on a mobile device and provide an annotation of the environment via the mobile device. The image data and the annotation may be processed to determine relative height and elevation information. The elevation information may then be compared to known elevation data and the user's position can be determined quickly and accurately, even where the data includes some degree of noise or inaccuracy. In particular, in a first embodiment, a method of determining a geographic location from a comparison of an image of an environment with user annotations and elevation data, comprising the steps of obtaining data indicative of regions of the earth from a plurality of data sources, wherein the data indicative of the regions of the earth comprises the elevation data, creating grid points in the data indicative of the regions of the earth, generating skyline models from the elevation data around each grid point, receiving the image of the environment at the geographic location from a camera of a mobile device, receiving, by at least one processor on the mobile device, an annotation from the user via the mobile device, wherein the annotation is indicative of a skyline in the image, performing, by the at least one processor on the mobile device, edge detection analysis to detect the skyline in the image, verifying, by the at least one processor on the mobile device, which pixels are skyline using a convolutional neural network and neural network classification, analyzing, by the at least one processor on the mobile device, the skyline to determine height information associated with the skyline, and comparing, by the at least one processor on the mobile device, the height information with the skyline models to determine a most likely location of the environment in the image, wherein the skyline models are stored locally on a storage medium of the mobile device.

In a second embodiment, at least one or more non-transitory computer-readable media storing computer-executable instructions that, when executed by a processor, perform a method of determining a geographic location from a comparison of an image of an environment with elevation data, comprising the steps of obtaining data indicative of regions of the earth from a plurality of data sources, wherein the data indicative of the regions of the earth comprises the elevation data, creating grid points in the data indicative of the regions of the earth, creating radial lines or wedges projecting outward from the grid points at equally or unequally spaced intervals, generating skyline models from the elevation data along each radial line or wedge, receiving the image of the environment at the geographic location from a camera of a mobile device, receiving an annotation from the user via the mobile device, wherein the annotation is indicative of a skyline in the image, analyzing, by the at least one processor on the mobile device, the image and the annotation to determine height information of features in the image, wherein the height information is indicative of the skyline in the image, and comparing, by the at least one processor on the mobile device, the height information with the skyline models to determine a most likely location of the environment in the image, wherein the skyline models are stored locally on a storage medium of the mobile device.

In a third embodiment, a system for determining a geographic location from a comparison of an image of an environment with user annotations and elevation data, comprising a data store storing data indicative of a region of the earth, a processor, a mobile device comprising a camera, and at least one non-transitory computer-readable media storing computer-executable instructions that, when executed by the processor, perform a method of determining the geographic location, the method comprising the steps of obtaining the data indicative of the regions of the earth from a plurality of data sources, wherein the data indicative of the regions of the earth comprises elevation data, creating grid points in the data indicative of the regions of the earth, creating radial lines or wedges projecting outward from the grid points at equally or unequally spaced intervals, generating skyline models from the elevation data along each radial line, receiving the image of the environment at the geographic location from the camera of the mobile device, receiving an annotation from the user via the mobile device, wherein the annotation is indicative of a skyline in the image, creating regions of a reduced number of pixels based at least in part on the annotation, performing edge detection analysis on the regions to detect the skyline in the image, determining height information of the skyline in the image, wherein the height information is indicative of the skyline in the image, and comparing the height information with the skyline models to determine a most likely location of the environment in the image.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTIONS OF THE DRAWING FEATURES

Embodiments of the invention are described in detail below with reference to the attached drawing figures, wherein.

The drawings do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention perform geolocation in environments where GPS may be degraded or unavailable. A user may take a photograph of the environment, which may be an urban environment including a skyline, using a mobile device. The user may trace the skyline to provide regions that may be analyzed to detect the skyline using a Convolutional Neural Network (CNN). The resulting skyline may be compared to elevation models to determine a location of the user. In some embodiments, vegetation, landmarks, and other features in the image may also be compared to region-specific data to aid in determining, or verify, the location.

In some embodiments, open source data of the Earth's surface may be combined to produce a GKB. The GKB may comprise elevation, landmarks, landcover, water bodies, water lines, and any other data that may be useful. Further, in some embodiments, the Earth's surface may be broken up into grids to narrow the field of search to smaller and smaller areas to reduce the data analysis.

In some embodiments, the list of locations may be determined with relative likelihood based on camera information such as tilt, roll, and relative distance to objects in the image. Further, the objects in the image such as, for example, skylines, landcover, and landmarks may be used. The image, user annotations, and known camera information may be processed to obtain information that may be compared to the information in the GKB. The user annotation may be corrected using edge detection models and a CNN may analyze the image and edge detection information to determine the skyline in the image. A location match may be determined from the CNN skyline model and a skyline model determined from the elevation data from the GKB. The most likely location match based on the comparison may be provided to the user.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1:
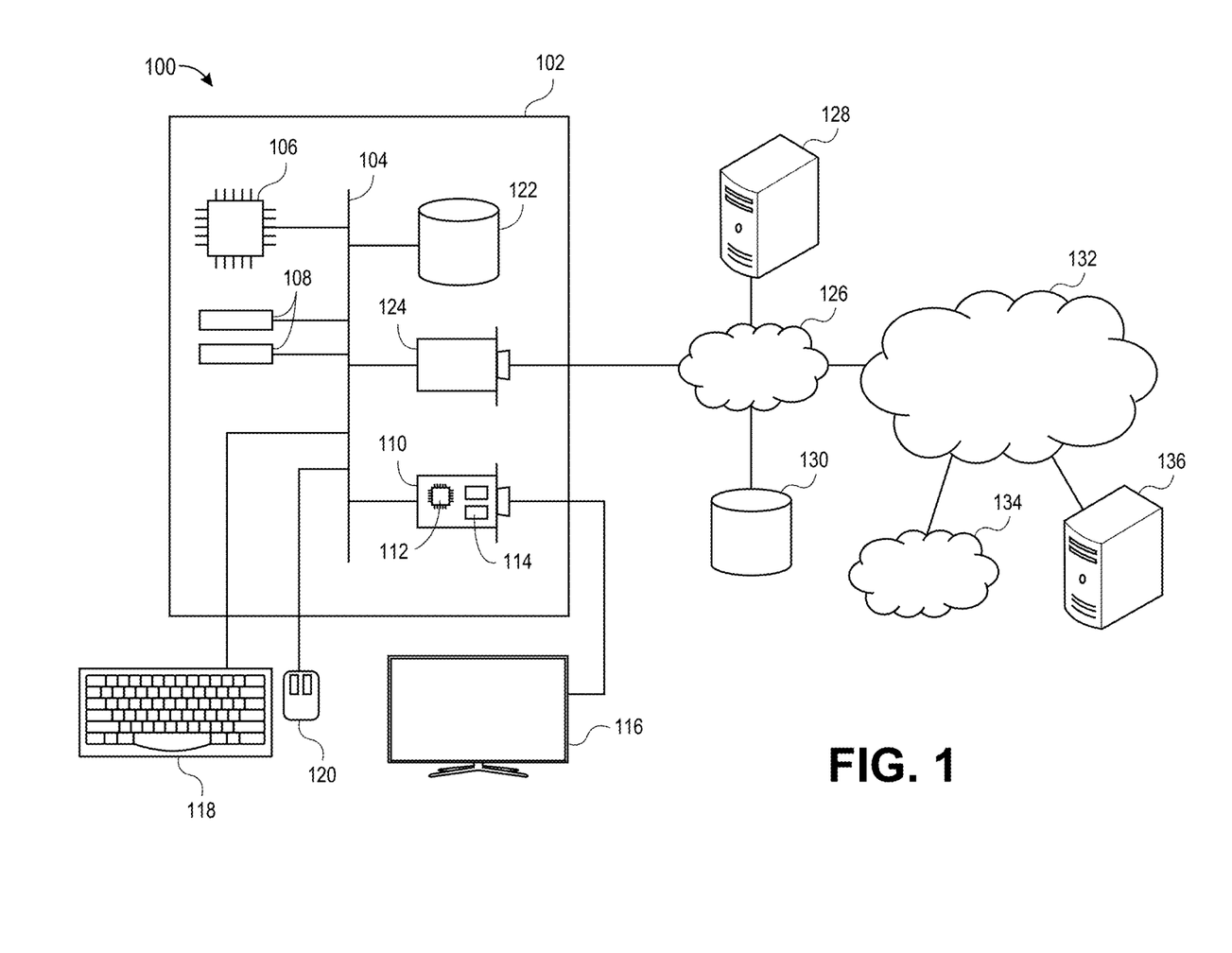
FIG. 1 depicts an exemplary hardware platform for certain embodiments of the invention.

Turning first to FIG. 1, an exemplary hardware platform 100 for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, in some embodiments, network interface card (NIC) 124 is also optionally attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
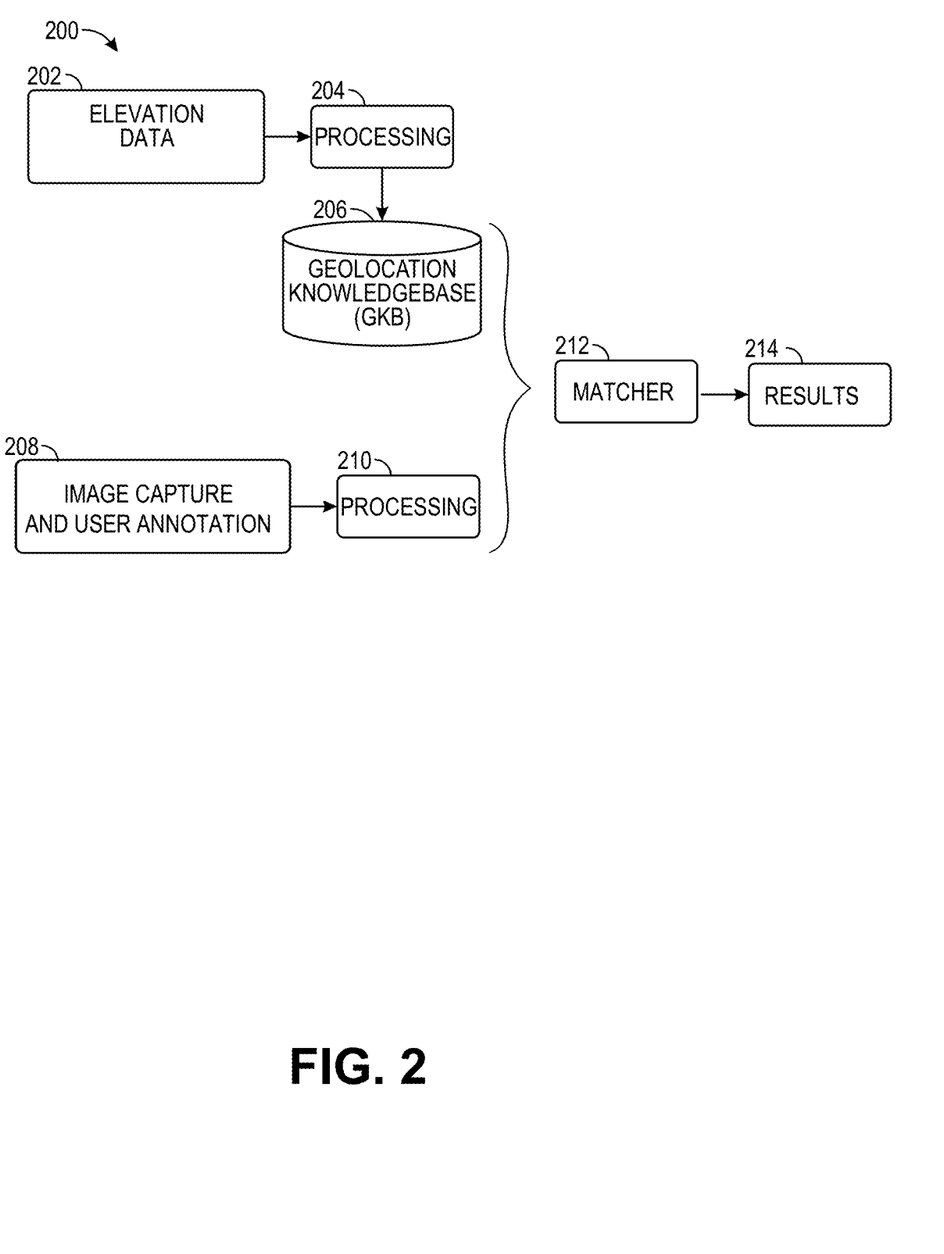
FIG. 2 shows an exemplary method of matching an image with Geolocation Knowledge Base data.

In some embodiments, as depicted in FIG. 2, a process for determining a geographic location where a photograph or video was taken, generally referenced by numeral 200, is presented. In some embodiments, the process may comprise combining global open source data indicative of features of the earth's surface and objects on the earth's surface and comparing with data obtained and provided by a user. An image obtained by the user and the global data may then be compared to determine a list of candidate geographic locations of the environment depicted in the image.

At step 202, global data is obtained. The global data may be geographic data that, in some embodiments, may be open source data. The geographic data may be obtained via satellites, aerial vehicles, and ground/water collection methods. The global data may include images, video, annotation, any user added text, location information, relative distance information between objects, topography, landmarks, or any other information that may be useful for determining skyline models as described in embodiments herein. Elevation data may be collected from stereo pair imaging, radar, or other elevation measurements. In some embodiments, the elevation models are derived from Advanced Spaceborne Thermal Emission and Reflection Radiometer (ASTER), Shuttle Radar Topography (SRTM), TerraSAR-X add-ons for digital elevation measurements (TanDEM-X), and any other sources of DEM.

Further, in some embodiments, land cover data may be obtained for comparison with the images. The land cover data may be obtained from GeoCover Landsat 7 data, LandScan global population distribution data for urban and rural environments, and other data with vegetation indexes.

In some embodiments, crowd sourced datasets of streets, rivers, landmarks, and any other information supplied by people may be used. In one example, this information may be obtained from Open Street Map (OSM). Further, in some embodiments, country outlines may be obtained from ArcGIS, shoreline data may be obtained from the National Oceanic and Atmospheric Organization (NOAA), and cell tower information may be used from Open Cell ID. The data may be combined to create information indicative of any region in the world and may generally be referred to as region-specific data or global data.

The global data covers most of the world and, therefore, provides expansive coverage of the earth for visual-based location determination. In some embodiments, at block 204 the global data may be processed and combined to create data that is indicative of elevation, landmarks, and natural and manmade structures at worldwide locations. In some embodiments, the global data from each of the sources may be combined into a large data set and masks created for categorization and efficient access and comparison. Further, the data may be broken up into various regional locations based on grid creation over the earth's surface as described for some embodiments below.

In some embodiments, the global data may be processed in block 204 to create a GKB 206. The GKB may comprise elevation data of urban environments obtained from regularly-spaced elevation data, such as, for example, DEM, and DSM, or any irregularly spaced elevation data such as, for example, point cloud data. The elevation data may be indicative of the relative heights of structures in the urban environment. For example, neighboring buildings may have different heights. The height differences may be determined from the elevation data and, when an image is received and a skyline is determined, the relative heights may be compared to the skyline to determine possible locations where the image was taken. In some embodiments, the actual elevations from the image are known or estimated, and compared to skyline models created and stored in the GKB and mobile device of the user.

In some embodiments, the GKB may include masks created for different features included in the environments. For example, masks may be created for ocean, land, vegetation, desert, forest, urban, rural, mountains, hills, valleys, ridgelines, houses, buildings, or any other feature in the environment that may be categorized to create efficient search queries and stored in the GKB. In some embodiments, a mask may include elevation information of urban areas and may be accessed individually and compared to the skyline determined from the received and processed images.

In some embodiments, the GKB in block 206 may be any database accessible by the user in the field. The GKB may be accessed wirelessly or may be stored on a hard drive or otherwise accessible by the user on a mobile device. The mobile device may be any end-user device such as, for example, a cell phone, a tablet, a laptop, a headset, or any other electronic device comprising one or more non-transitory computer-readable media storing computer-executable instructions paired with a processor. In some embodiments, portions of, or all of, the GKB may be stored on the mobile device. For example, the user may be a military soldier stationed in Afghanistan. Because the soldier is expected to be in this region only, data (e.g., skyline models) indicative of Afghanistan is stored. Further, the soldier may be on a mission in a particular region of Afghanistan such as Kabul. In this situation, the user may only require data indicative of Kabul. This may reduce the amount of data that may be filtered while in the field and reduce the time to run the image against the region-specific data. Further, in some embodiments, the user may input an expected region in which the user is located and the matching search may begin with, or be limited to, that region or general location. In some embodiments, the region-specific data may generally reference global data or a reduced data subset of the global data such as, for example, Afghanistan and Kabul. In some embodiments, the region-specific data comprises skyline models, vegetation, and landmarks.

Further, in some embodiments, only necessary information from the GKB may be stored on the mobile device. For example, only elevation data may be stored such that skyline information may be compared. In some embodiments, elevation information as well as landmark data is stored. It should be appreciated that any combination of data and masks may be stored on the mobile device to reduce storage requirements and increase processing efficiency.

At block 208 the image is collected by the user and submitted for location determination. The image may be collected by any camera or via the user mobile device and any associated metadata and added text and user annotations may be provided with the image. In some embodiments, the user may add annotations by text input and, in some embodiments, the user may provide outlines of objects directly on the screen and store the image with the annotations. For example, the user may outline or trace an urban skyline where the buildings and terrain meet the sky. This annotation may be submitted to the application for processing. The user may further provide a general region of interest to immediately narrow the matching region of interest and reduce the data to be processed.

At block 210, the image may be processed. The image and the user annotation may be analyzed to remove any user error in the annotation. For example, the user may provide a line using their finger that moves off into the sky. This section of the line can be removed quickly and is discussed in more detail below. Further, the user annotation may provide a reduced-pixel region for analysis by a CNN to perform edge detection to determine the skyline. Once the skyline is determined, the relative heights of the buildings and, in some embodiments, estimated elevation information may be compared to the skyline models stored in GKB at block 212.

At block 212 the image and skyline may be compared to the global data or to the region-specific data which may be a subset of the global data narrowed to the region of interest. An error between the skyline models generated from the GKB data and the image relative heights and elevation may be determined. The locations providing the least error may be stored and the most likely location (e.g. the location with the least error) may be presented to the user as the results in block 214.

In some embodiments, the results may be presented to the user as world coordinates and show the location on a map. The map may be a satellite map or another aerial view. In some embodiments, many possible closely related locations may provide a high probability of the location of the image. In this case, the cluster of locations may be reduced to a single location for presentation to the user.

Figure 3:
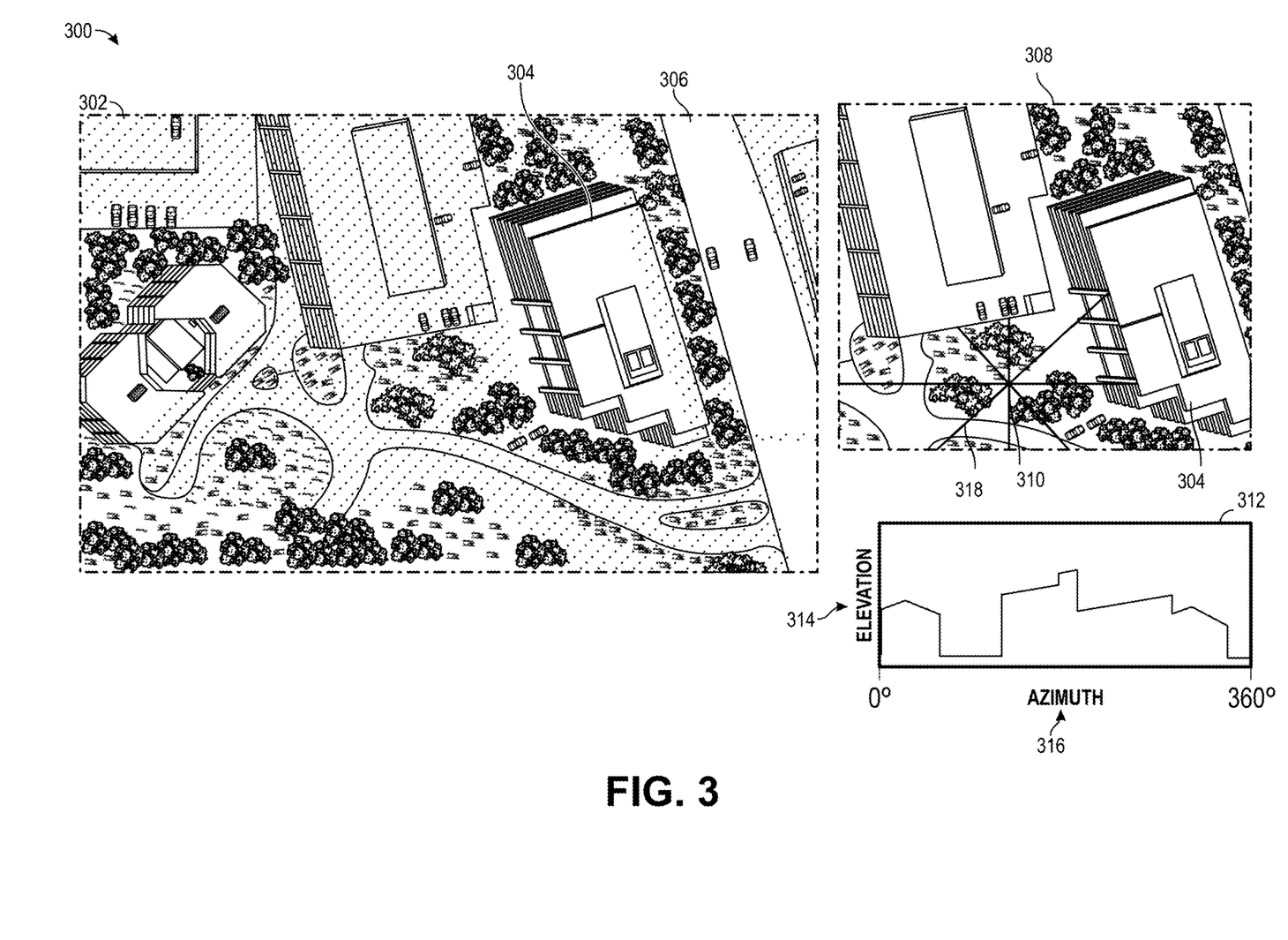
FIG. 3 depicts exemplary diagram of a process of determining a skyline model from elevation data.

FIG. 3 depicts an exemplary process of creating the elevation models of an urban environment generally referenced by the numeral 300. At block 302 an exemplary aerial view of the environment is shown with equally spaced grid points. In some embodiments, the grid points may be 2-10 meters apart. In some embodiments, the grid points may be unequally spaced. Grid points may be locations analyzed to determine the surroundings, or the environment, of the grid point. A dense grid spacing may provide a high volume of grid points in a region for analysis of a skyline from a 360 degree sampling at each grid point. In some embodiments, the grid point spacing is less dense. The grid points may be arranged in any pattern and may be square, rectangular, polygonal and regular or irregular shape.

Further, features in the environment may be recognized, such as the building 304 and roadway 306. In some embodiments, these landmarks may be stored in the GKB to further determine location when compared to objects in the image. In some embodiments, vegetation and material characteristics are determined that may also be used to aid in determining location.

At block 308, an individual grid point 310 is used to determine elevation and develop a skyline model. In some embodiments, equally spaced radial lines 318 are projected 360 degrees from the grid point 310 for elevation sampling to create an elevation model. As shown in FIG. 3, the angle increments are 45 degrees. However, the angle increments may be less than 45 degrees down to one degree or less or, in some embodiments, greater than 45 degrees. In some embodiments, angle increments of 0.25 degrees may be used. The distance from the grid point 310 to features in the image such as building 304 may be determined. The elevation information along with the location of the grid point 310 may be used to determine the distance from the grid point 310 to the building 304. For example, an abrupt change in elevation may indicate the location of the building. Combining the information from the elevation measurements along the radial lines 318 and the location information of the grid point may provide a skyline model as depicted in block 312.

In some embodiments, pie-shaped wedges may be analyzed similarly to the 360 degree regions described above. The wedges may be projected outward from the grid point 310 and elevation information may be determined in the wedges. In some embodiments, radial lines 318 may bisect the wedges and elevation data may be determined along the redial lines 318 within the wedges.

Block 312 depicts an exemplary skyline model created for the grid point 310 in block 308 at the sampling radial line points. The skyline model includes the elevation 314 determined from the DEM, DSM, or other general elevation data and a 360 degree azimuth 316 angle surrounding the grid point 310. This creates a full 360 degree view of the skyline from the grid point. In some embodiments, the angle increments may be any number and equally spaced or unequally spaced such that an accurate representation of the skyline is depicted and a skyline model created therefrom. A plurality of skyline models may be created from a plurality of grid points. The skyline models may be compared to the skyline determined from the image taken by the user to determine the most likely user location.

In some embodiments, the user may submit an image to the application for comparison to the GKB data for location determination. The user may collect an image in any environment around the earth. The image information may be a single image, a panoramic image, or a plurality of images from a single location that may be analyzed together. The information in the image that may be analyzed may be urban skyline, landmarks, land cover, and any other information that is stored in the GKB and may be compared to the image data.

Figure 4A:
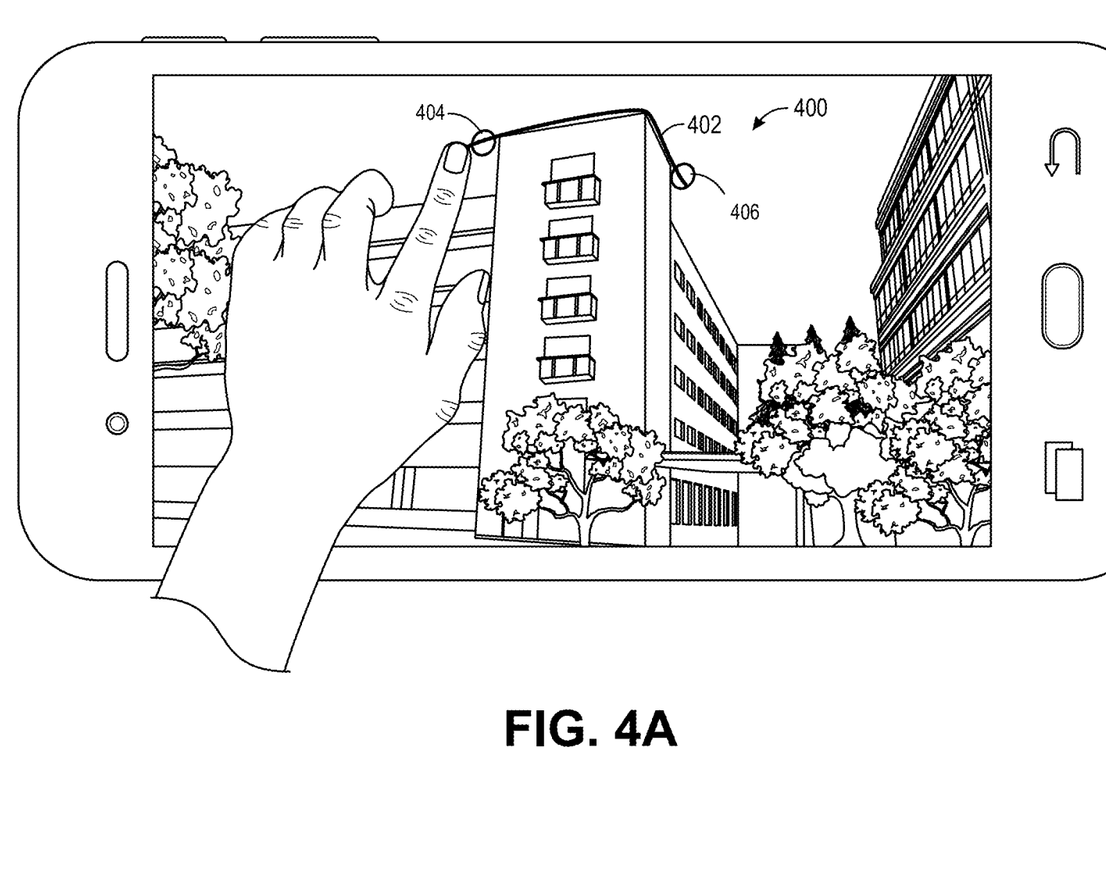
FIG. 4A depicts an exemplary user annotation of a skyline in an image.
Figure 4B:
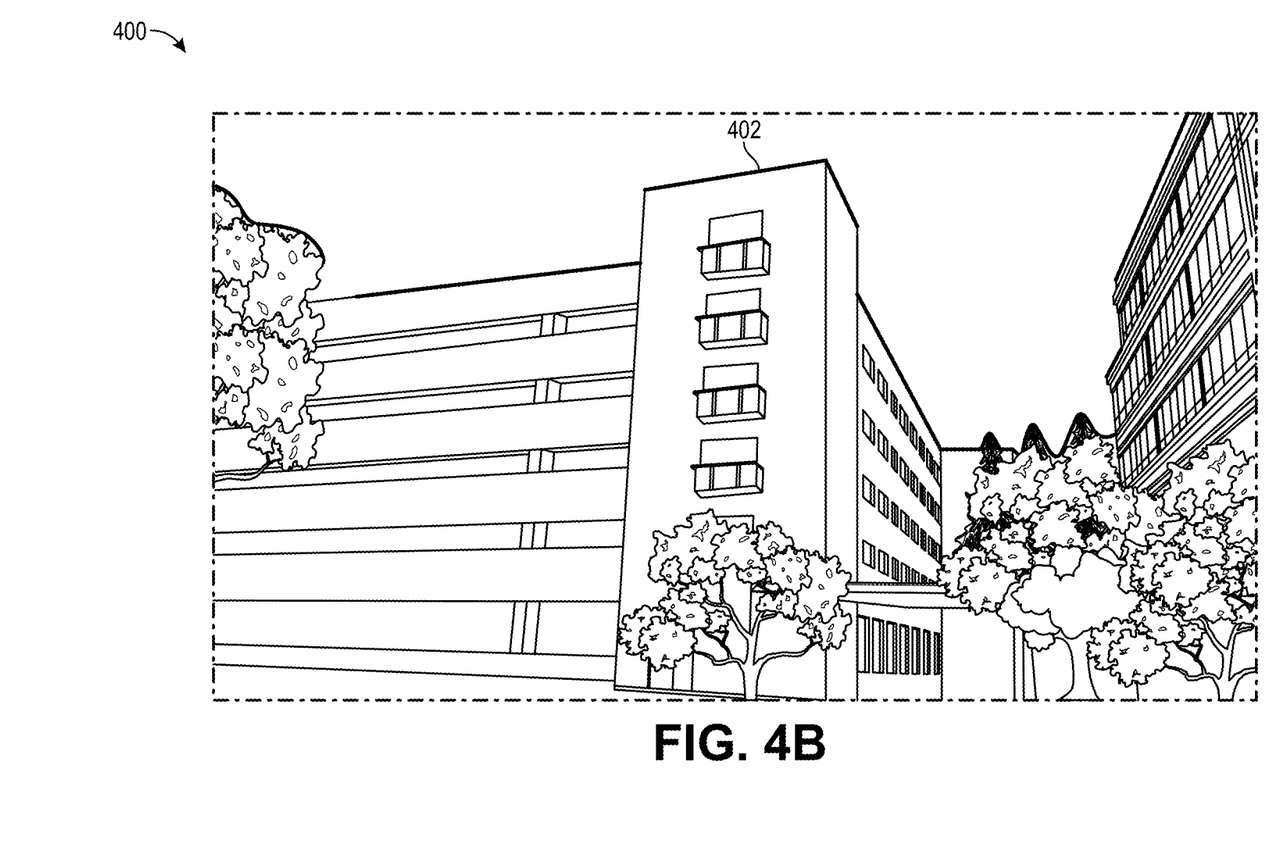
FIG. 4B depicts exemplary skyline annotation correction.

FIGS. 4A-B depict an image with a user annotation outlining the skyline of the urban environment. FIG. 4A depicts a user annotating the urban skyline 400 by swiping a finger across the intersection of the buildings and the sky. The location that the user touches on the image may present a skyline 402 that the user may use to see if the annotation is correctly registered and shows the intended input. The user may delete any annotation and repeat. Further, in some embodiments, the user may touch and move the line around the screen or manipulate the line curvature and length to get a close match to the building edges.

In some embodiments, the application may automatically correct for differences in the annotation and the edge of the skyline 400. FIG. 4A depicts the finger swiping past the edge of the building into the sky to create an overshoot 404. This may be recognized and compared to preliminary edge detection models of the image and removed. Further, a contrast between the building and the sky may be used for a preliminary adjustment of the annotation. In some embodiments, the annotation may define a region of reduced pixels to be run through the CNN.

In some embodiments, the user may also indicate on which side of the skyline annotation the sky lies and the building lies. The user may touch the sky and touch the building before or after the skyline annotation to indicate which side is the sky and which side is the building. Further, the user may indicate different buildings with different inputs such as touching the buildings in order. The user may further indicate different buildings, vegetation, streets, and any other feature in the image that may be useful in determining the location.

FIG. 4B depicts a corrected user annotation adjusted by removing undershoot 406 and overshoot 404 and filtering the annotation through the CNN and, in some embodiments, combining with preliminary edge detection models prior to filtering, as described below. As can be seen, this causes the initial user-annotated edge to snap to the precise boundary of the skyline.

In some embodiments, mobile device information may be obtained for analysis to provide more information about the image. For example, the user may be standing on the ground such that the camera of the mobile device is tilted upwards at the skyline. This may cause a relative difference in the heights of the buildings based on the distance to the user. Sensor data may be accessed to determine the tilt of the mobile device to compensate for any variations due to camera tilt. Further, the mobile device may be rolled or tilted sideways such that buildings would appear to have a grade. The mobile device sensor information may provide orientation data for the mobile device such that this grade may also be compensated. In case the information from the mobile device is unavailable or compromised, tilt, roll, and focal length may be estimated. Tilt, roll, and focal length estimation is described in detail in application Ser. No. 16/818,552 incorporated by reference in its entirety herein.

In some embodiments, the location and angle of the sun and the location of the stars may be used in determining the geographic location of the environment in the image and user. The location of the sun and stars as well as the date and time may be used to narrow down the search to a smaller geographic area. For example, the moon may appear in the image obtained by the user in a relative location to the big dipper. Based on metadata associated with the image from the mobile device and information obtained from the image, location candidates may be determined and compared to the location candidates from the skyline analysis.

Figure 5:
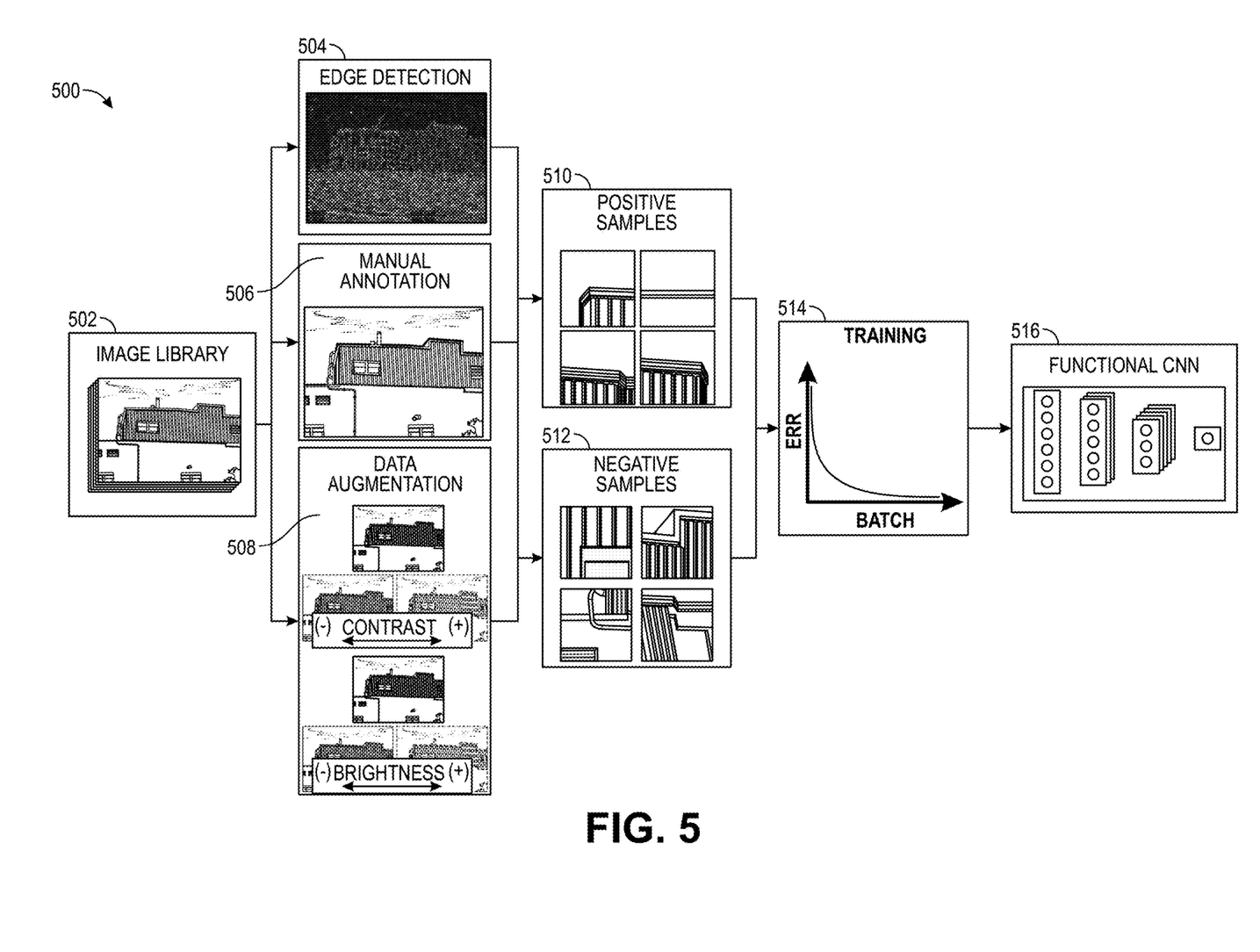
FIG. 5 depicts an exemplary process for training a convolutional neural network to detect skylines from images of an urban environment.

FIG. 5 depicts a training sequence for the CNN to detect the skyline represented generally by the numeral 500. The training sequence may provide convolution layers capable of accurately determining patterns for edge detection of the skyline. At block 502, an image library is accessed. The image library contains images with known features and skylines.

At block 504 various edge detection techniques may be employed to determine edges in the image obtained from the image library. Various edge detection techniques may be used to detect the edges from the image for input into the CNN for training purposes. Further, as described below, these various edge detection techniques may be used in combination with the user annotation and the data augmentation in the skyline determination. Any single detection technique or a combination of edge detection techniques may be used in this phase.

At block 506, the manual annotation may be used to reduce the region of the image used for CNN training. During operation a user may use a swipe to indicate the region of the skyline and thus reduce the number of pixels the CNN needs to analyze as depicted in FIG. 4A. During training this manual annotation may be used to ensure that the CNN is trained using pixels that are similarly close to the horizon. For example, only pixels that are 5 pixels away from an annotation may be used to train the CNN. In some embodiments, a square or rectangular region surrounding the annotation is analyzed. In some embodiments, the region comprises a 29 by 29 pixel region. In any case, the user annotation may reduce the number of pixels and the area of the image used for training the CNN.

At block 508, the contrast and brightness of the image may be altered to provide images that represent skylines in a range of possible atmospheric conditions and photographic settings. The data augmentation may alter the appearance of edges by adjusting the brightness and contrast of the image and the objects in the image. This may simulate atmospheric conditions that blend objects, such as, darkness, fog, rain, or any other conditions, or photographic settings that change the appearance of photos such as exposure, white balance or other settings. Augmentation of the images may provide more varied skylines to train the CNN making the CNN more robust in skyline detection.

At block 510 positive samples may be filtered from negative samples. The positive samples are samples where it is determined that an edge between the building in the image and sky exists. The positive samples may be determined by running the images through convolution layers in the CNN to detect upper edges of objects in the image. The CNN process is described in detail below. The negative samples are samples where it is determined that no edge between the building and the sky exists. As the training proceeds, filters in the convolution layer are updated that provide better and better results for edge detection for the skyline determination. When the results, as compared to the original image, provide error below a given threshold, the CNN training is complete and initial values for the convolution layers are determined.

Figure 6:
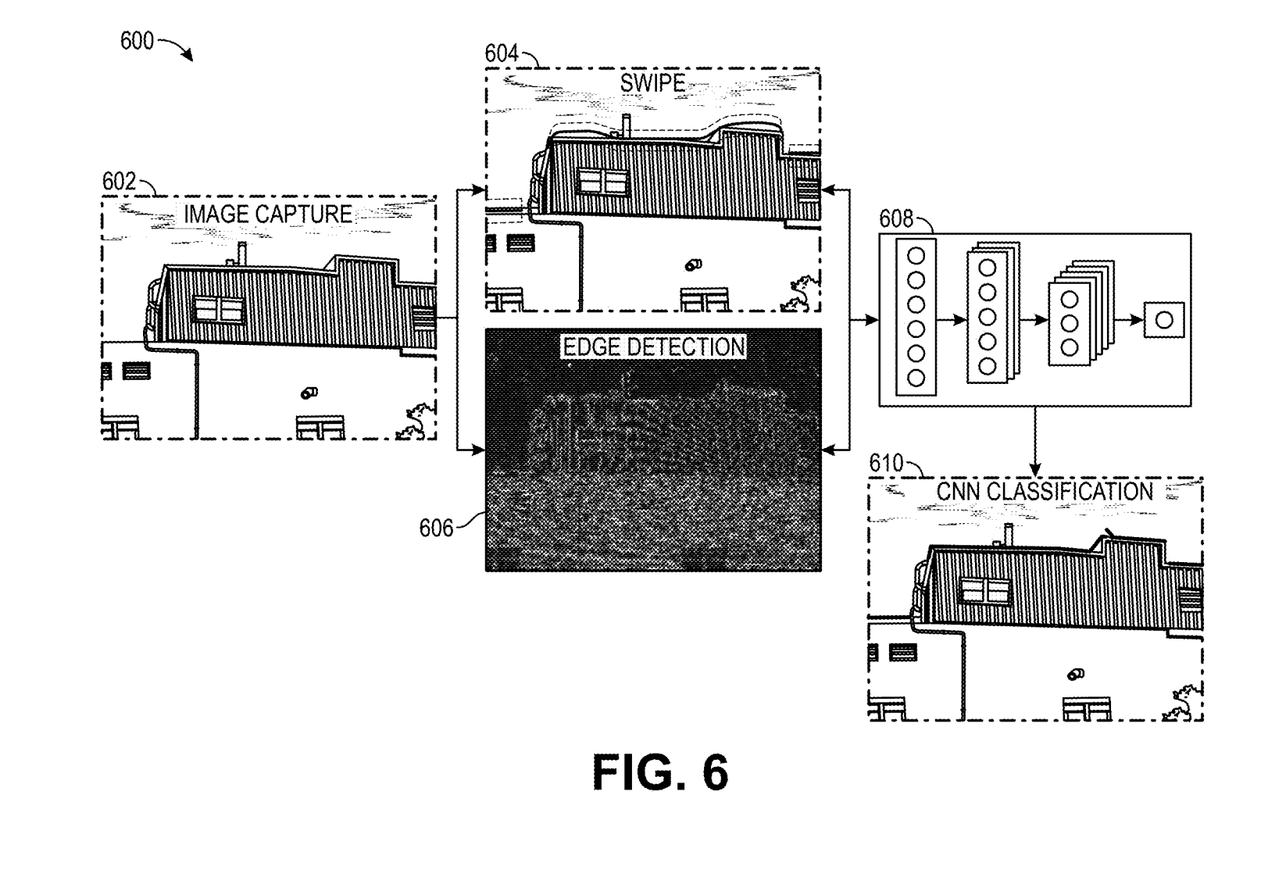
FIG. 6 depicts an exemplary process of detecting skylines using the convolutional neural network.
Figure 7:
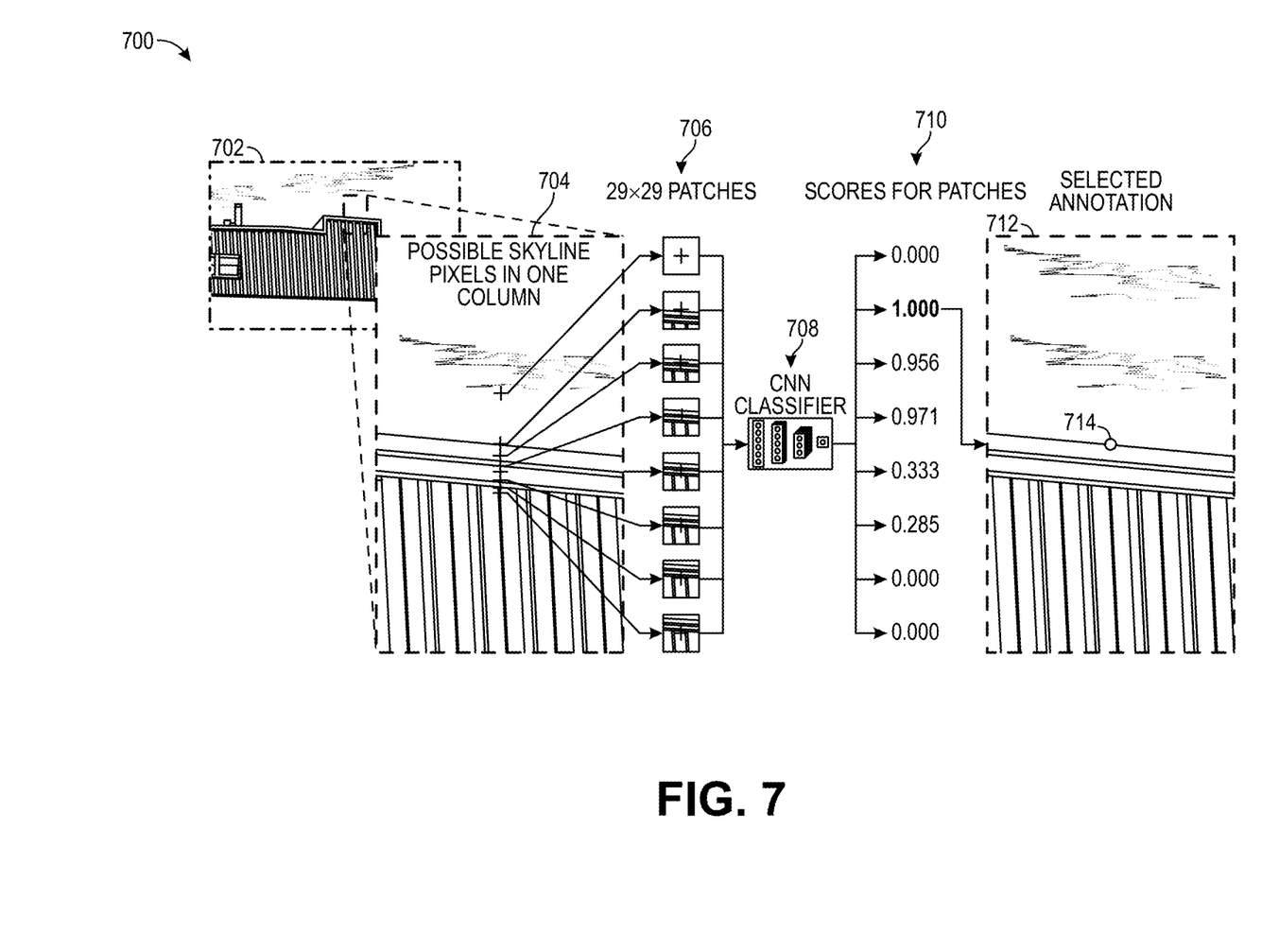
FIG. 7 depicts an exemplary process of detecting skylines using the convolutional neural network.

FIGS. 6 and 7 depict a process of using an image of an urban environment and utilizing the CNN to classify the environment and determine the skyline such that a determination of the location in the image can be made. At block 602, the image is captured with the mobile device. Information from the mobile device may be obtained such as, for example, metadata associated with the image such as time, orientation, focal length, and any other data that may be useful. Further, information from the sensors may be obtained such as, for example, accelerometer, gyroscope, or any other sensor data that may be useful. The information and the image may be used to determine the location of the image.

At block 604, the user may swipe along the skyline to provide an initial rough location of the skyline as depicted in FIG. 4A. This may provide regions for edge detection analysis by the CNN. The regions may be defined as within a set number of pixels of the user annotation. Further, the regions may be rectangular and a set number of pixels for a set matrix analysis by the CNN. The CNN may then only analyze the pixels within these regions as the edge of the skyline should fall in these regions as defined by the annotation. This may provide a number of pixels to analyze that is reduced from an analysis of the entire image which provides faster processing time.

Further, results of the CNN may be heightened by providing alternative image analysis to be combined or compared with the user annotation images. At block 606 a preliminary edge detected image may be provided for comparison and statistical combination with the user image. The preliminary edge detected image may be a rough detection that increases the confidence of the location of the edge detection and the results of the CNN analysis. The preliminary edge detection may be utilized to refine the annotation by removing finger slop and adjusting the annotation to better represent the edge of the features in the image.

At block 608, the CNN runs the images through CNN layers. The CNN comprises convolution layers that detect patterns in the regions by providing a matrix that the pixels run through, thus defining the contrast between each pixel as described in more detail below in FIG. 7.

At block 610, the final image depicting the edge of the skyline is depicted (see FIG. 4B). The upper edges of the building are determined. In some embodiments, layers of the CNN may detect upper edges. However, side edges, lower edges, and left and right edges may also be detected. In some embodiments, any shapes may also be detected. The CNN results may be classified as, for example, building, house, tree, or any other object that may be detected in the environment. Relative heights of the edges may be determined as well as elevations. The relative heights and elevations may be compared to the data in the GKB to determine the location in the image. Though only a partial building is depicted in FIGS. 6 and 7, full 360 degree views may be obtained from the camera in either a panoramic view or through combining a plurality of images to analyze and compare full 360 degree skyline models from the region-specific data.

FIG. 7 depicts the exemplary CNN analysis of a region of the image depicted in FIG. 6 generally represented by the numeral 700. In block 702, the image from FIG. 6 is depicted with a smaller region analyzed using the CNN. The region 704 is broken into an exemplary single column of 29×29 patches 706. Each patch may be run through the CNN classifier 708 that comprises convolution layers that pass each patch through a matrix that detects patterns such as, for example, upper edges. The scores 710 for each patch are the result of running each patch through the convolution layers. If an edge is detected the score for the patch is an exemplary 1.000 and the probability of an edge detection may be represented in the patches close to the edge. In some embodiments, the patch with the highest edge detection score may be used for the edge of the skyline. This process may be performed along the annotation detecting the edge of the building and, thus, the skyline.

The result 712 represents the same region 704 with a single exemplary skyline point 714 estimated from the column of patches. The exemplary point 714 was selected from the second patch down in the column of exemplary patches 706 with the associated edge detection 1.000. When all patches are analyzed and the skyline edge is detected the CNN moves on to the next region to analyze the next set of patches.

Figure 8:
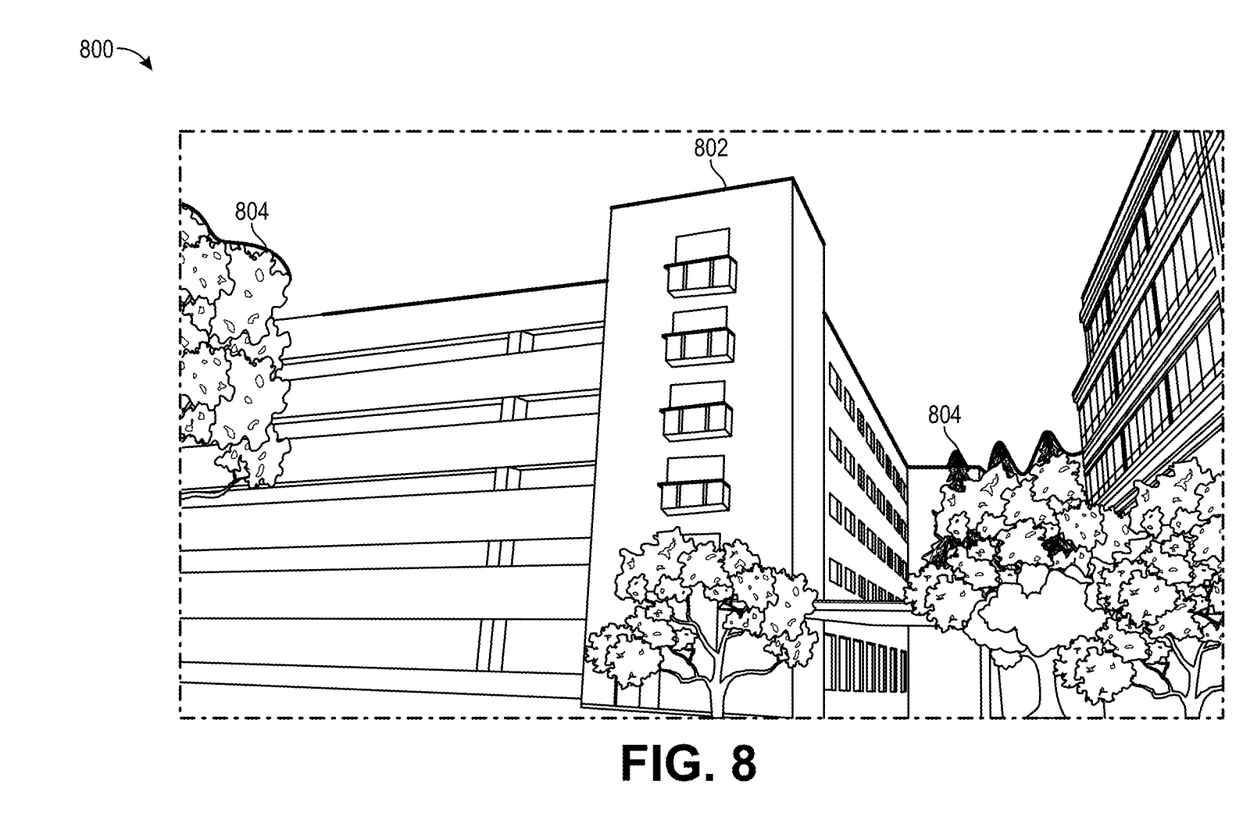
FIG. 8 depicts an exemplary detected skyline complete with vegetation.

FIG. 8 depicts an exemplary final computer-generated annotation 802 of the skyline generally referenced by the numeral 800. In some embodiments, the user-generated annotation 802 is run through the CNN to accurately detect the edge of the building against the sky as described above. Further, vegetation may also be detected from environmental models as described above. The edge of the vegetation 804 may also be added into the annotation and may be used in some exemplary location determinations. In some embodiments, the vegetation is determined from material and vegetation data in the GKB and is automatically annotated by combining the vegetation and elevation models.

In some embodiments, the actual elevation of the skyline is used to determine the location. However, in some embodiments, the actual elevation may not be known and the relative height differences between the buildings may be used. A standardized height map may be created from the elevation models based on the ground level and the height of the buildings in the skyline may be estimated based on the camera orientation as described above. The relative heights may be compared to the normalized model heights for location determination. Further, the relative distance between buildings and other objects in the image may be compared to relative distances of the skyline models in the GKB.

During the matching phase, the image, video, text description, annotations, and any other data is received from the user. The user input data is then compared to the GKB data to determine likely matches and provide the user with likely geolocation candidates based on the comparison of the skyline determined from the image and the skyline models in the GKB. If a general location is known, all other data is omitted from analysis. As in the example provided above, if a user knows that they are in Kabul, Afghanistan, then Kabul is labeled as a region of interest and elevation data or skyline models for that region is analyzed. In some embodiments, this region is referred to as region-specific data. In some embodiments, the region-specific data may be all GKB data or any subset thereof and may be stored on the mobile device.

Figure 9:
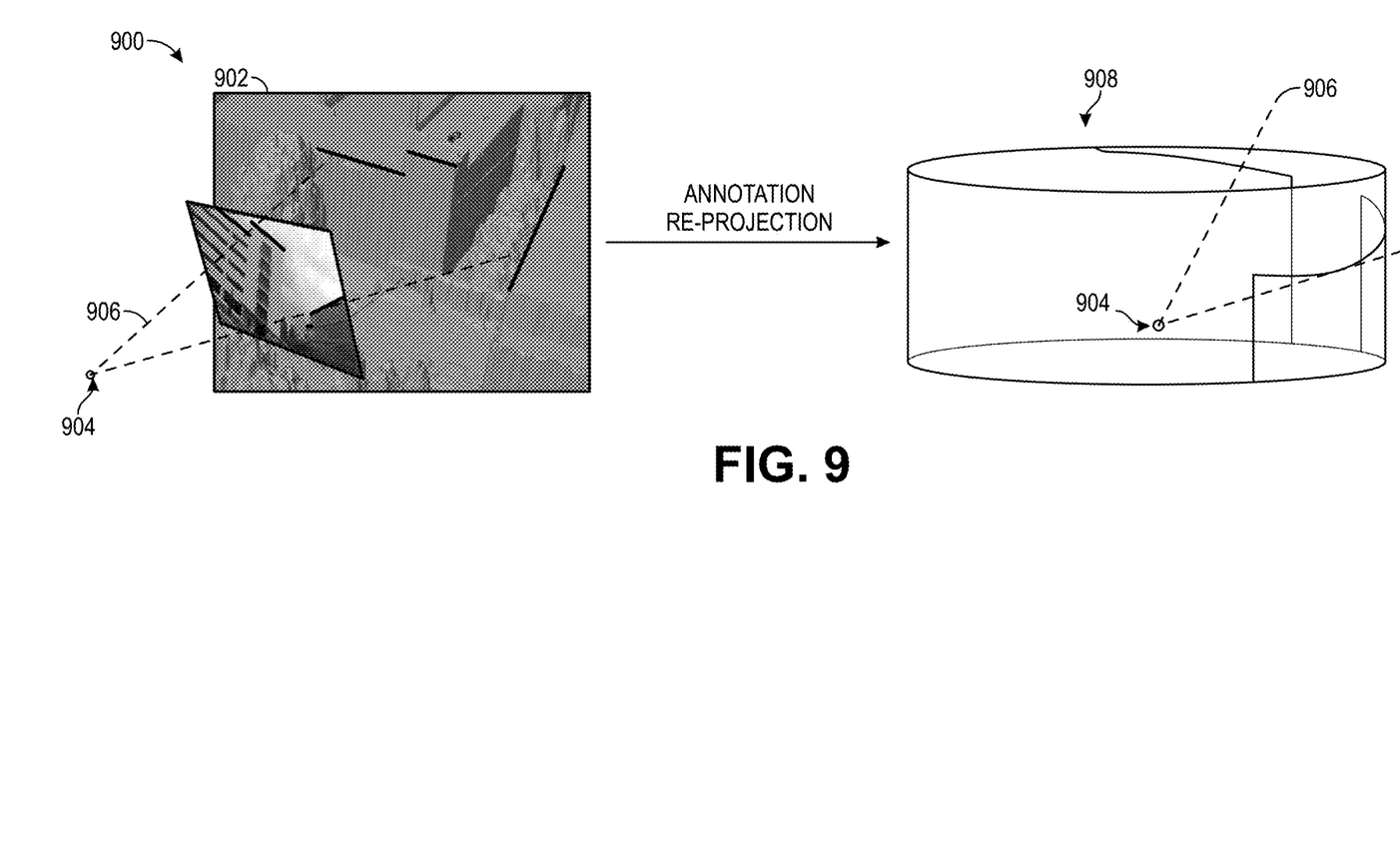
FIG. 9 depicts an exemplary process of determining a cylindrical re-projection of the image data for comparison to the Geolocation Knowledge Base (GKB) data.

FIG. 9. depicts an exemplary process for modeling a 360 degree view from the received image of the environment and comparing to GKB skyline models generally referenced by the numeral 900. The application utilizes a re-projection method for fast matching. When the image 902 is taken of the environment from the user location 904 and annotation is added, the perspective of the image 902 and the distance from the camera to the objects in the environment distort the environment depicted in the image. The image 902 has a perspective projection 906 from the user location 904 and the annotations are projected onto a flat image pane with a tilt and roll. The GKB projections are cylindrical without tilt and roll. To compare the image to the GKB data, the image may be mapped to a cylinder 908 surrounding the user location 904 as shown in FIG. 9. The cylinder 908 radius may be based on the distance from the user location 904 to the objects in the image 902. This allows a direct comparison to the GKB data. Given that a cylindrical representation 908 with heights and distances could be equivalently represented as a spherical projection with elevations and radii, the annotation may be re-projected into a spherical coordinate system and compared to a spherical representation of the skyline model in the GKB.

Further, the process is a single phase match process. The best location is determined with one pass comparing the determined skyline with the GKB data. There is no refinement necessary which reduces processing.

In some embodiments, the best location is determined by comparing the detected skyline to the GKB data as described above. In some embodiments, an error such as, for example, root mean square error between the skyline and the GKB elevation models is determined. The best location may be the location with the lowest error or highest associated ranking thereof.

In some embodiments, many high ranking individual locations may be in close proximity. In this case, a cluster of locations may be viewed as a single location. A location that is central to the area density of the cluster on the grid may be used with a high likelihood of the location based on the cluster density. This reduces the number of locations presented to the user to one location. In some embodiments, the location error may be 2 meters or less.

In some embodiments, the user may view the locations of the geometric candidates from satellite images and from ground view. The user may provide feedback and another image, and the analysis may be performed again incorporating the feedback into the secondary search.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of determining a geographic location of an environment from one or more images of the environment using user annotations, the method comprising:
   receiving the one or more images of the environment at the geographic location from one or more cameras;
   receiving a user annotation, by a user, of an image of the one or more images,
   wherein the user annotation is indicative of an object in the image;
   detecting, by at least one processor, a skyline in the image based on the user annotation;
   analyzing, by the at least one processor, the skyline to determine height data associated with the skyline; and
   comparing, by the at least one processor, the height data with stored skyline models to determine a most likely location of the environment in the image.

2. The method of claim 1, wherein the user annotation is a tap or a swipe of the object in the image to indicate a location of the object creating the skyline.

3. The method of claim 1, wherein the user annotation is a trace of an upper edge of the object in the image to trace the skyline in the image.

4. The method of claim 1, further comprising:
   automatically determining an upper edge of the object;
   presenting, to the user, an indicia identifying the upper edge of the object; and
   receiving the user annotation, wherein the user annotation is an adjustment, by the user, of the indicia presented to more accurately represent the skyline.

5. The method of claim 1, wherein elevation data is obtained from at least one of a digital elevation model, a digital surface model, or a general elevation data.

6. The method of claim 1, wherein the one or more cameras is a mobile device and the at least one processor is disposed on the mobile device.

7. The method of claim 6, further comprising:
   performing, by the at least one processor on the mobile device, edge detection analysis on the image; and
   comparing, by the at least one processor on the mobile device, the user annotation to the edge detection analysis to refine the user annotation.

8. One or more non-transitory computer-readable media storing computer-executable instructions that, when executed by at least one processor, perform a method of determining a geographic location of an environment from one or more images of the environment using user annotations, the method comprising:

receiving the one or more images of the environment at the geographic location from one or more cameras;

receiving a user annotation, by a user, of an image of the one or more images, wherein the user annotation is indicative of an object in the image;

detecting a skyline in the image based at least in part on the user annotation;

analyzing, by the at least one processor, the skyline to determine height data associated with the skyline; and comparing, by the at least one processor, the height data with skyline models of the environment to determine a most likely location of the environment in the image, wherein the skyline models of the environment are determined from satellite image data.

9. The media of claim 8 wherein the one or more images are obtained from a plurality of cameras.

10. The media of claim 9, wherein the one or more images are combined and analyzed together.

11. The media of claim 8, wherein the computer-executable instructions are further executed to perform obtaining the satellite image data from open sources.

12. The media of claim 8, wherein the at least one processor and the one or more cameras are disposed on a mobile device; and wherein the computer-executable instructions are further executed to perform:

determining, by the at least one processor on the mobile device, an orientation of the mobile device from sensor data obtained from the mobile device; and augmenting, by the at least one processor on the mobile device, the skyline based on a tilt and a roll of the one or more cameras determined from the sensor data.

13. The media of claim 8, wherein the computer-executable instructions are further executed to perform:

determining vegetation from the image; and completing an edge of the object that is obscured by the vegetation.

14. The media of claim 8, wherein the computer-executable instructions are further executed to perform:

automatically determining an upper edge of the object;

presenting, to the user, an indicia identifying the upper edge of the object; and receiving the user annotation, wherein the user annotation is an adjustment, by the user, of the indicia presented to the user.

15. A system for determining a geographic location of on environment from one or more images of the environment using user annotations, comprising:

a data store storing data indicative of a region of Earth;

at least one processor;

a mobile device comprising a camera; and at least one non-transitory computer-readable media storing computer-executable instructions that, when executed by the at least one processor, perform a method of determining the geographic location, the method comprising:

receiving the one or more images of the environment at the geographic location from the camera;

receiving a user annotation of an image of the one or more images from a user by the mobile device, wherein the user annotation is indicative of an object in the image;

detecting a skyline in the image based at least in part on the user annotation;

analyzing, by the at least one processor, the skyline to determine height data associated with the skyline; and comparing, by the at least one processor, the height data with skyline models to determine a most likely location of the environment in the image.

16. The system of claim 15, wherein the computer-executable instructions are further executed to perform:

receiving on input from the user indicative of a geographic region that the user is in; and reducing an amount of comparison data associated with the skyline models for comparison based on the geographic region.

17. The system of claim 15, wherein the user annotation marks a width of the object; and wherein the computer-executable instructions are further executed to perform determining an upper edge of the object.

18. The system of claim 15, wherein the computer-executable instructions are further executed to perform:

automatically determining an upper edge of the object;

presenting, to the user, an indicia identifying the upper edge of the object; and receiving the user annotation, wherein the user annotation is an adjustment, by the user, of the indicia presented to the user.

19. The system of claim 15, wherein the computer-executable instructions are further executed to perform:

creating a spherical re-projection of the skyline; and comparing the spherical re-projection of the skyline to the skyline models to determine the most likely location.

20. The system of claim 15, wherein the computer-executable instructions are further executed to perform:

determining a location from a cluster of locations;

determining a single location from the cluster of locations; and presenting the single location to the user.

* * * * *